Feb. 6, 1962     M. M. MERLEN     3,020,407
HORIZON SENSOR
Filed Nov. 12, 1959     5 Sheets-Sheet 1
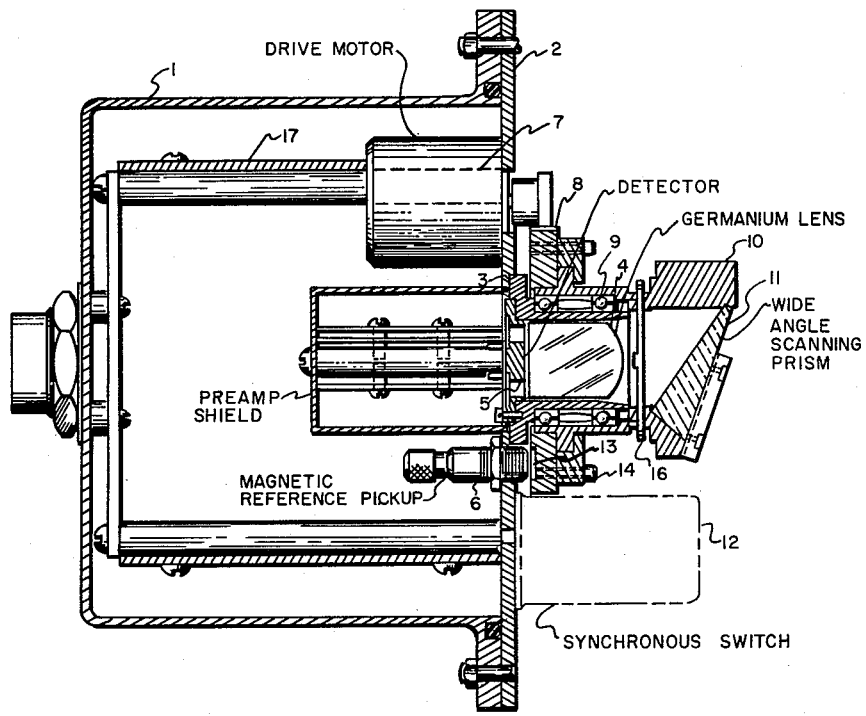
FIG. I
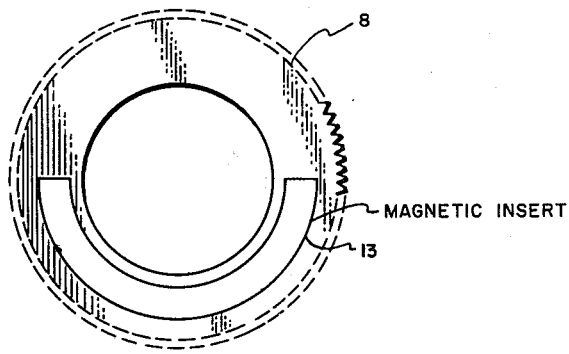
FIG. 2
MONTY M. MERLEN
*INVENTOR.*
BY
ATTORNEY

MONTY M. MERLEN
INVENTOR.

BY *Robert Ames Norton*

ATTORNEY

MONTY M. MERLEN
*INVENTOR.*

BY Robert Hume Morton

*ATTORNEY*

ALTITUDE vs. α

United States Patent Office 3,020,407
Patented Feb. 6, 1962

3,020,407
HORIZON SENSOR
Monty M. Merlen, Stamford, Conn., assignor to Barnes Engineering Company, Stamford, Conn., a corporation of Delaware
Filed Nov. 12, 1959, Ser. No. 852,548
20 Claims. (Cl. 250—83.3)

This invention relates to a horizon sensor using optical radiations and particularly radiations in the infrared.

The problem of sensing the horizon and producing a signal which indicates orientation with respect thereto is one which is encountered by extremely high-flying aircraft, for example those flying above 10 miles and particularly by moving bodies outside the earth's atmosphere such as satellites, missiles, space probes and the like. The problem is particularly serious with devices which experience free fall and cannot use references depending on gravitation. The problem will be described primarily in connection with an artificial satellite which is a typical illustration. It should be realized that the same problems arise with other vehicles as pointed out above and what is said is applicable to them too.

Early satellites did not maintain a constant attitude but wobbled and tumbled to a serious extent. It is a simple matter to correct the attitude of any object moving outside the earth's atmosphere provided it is known how much the device has departed from a predetermined desired attitude. Various correction means such as short puffs of gases from suitably placed orifices and the like correct attitude with great ease, and the present invention is not concerned with any particular design of righting devices or mechanisms. However, all mechanisms require information, preferably in the form of a suitable electrical signal, which measures the departure of the vehicle from a predetermined attitude.

The attitude of a satellite is determined by its position with respect to three axes at right angles to each other. Two of these axes are in a plane at right angles to a projected radius of the earth passing through the satellite and the third coincides with such radius. The plane in which the first two axes lie is parallel to the earth's horizon. It is with information on the attitude with respect to these two axes that the present invention deals. Once the orientation of the satellite with respect to these two axes is determined orientation around the other axis can be determined by other means utilizing gyroscopes, or observation of heavenly bodies. Each horizon sensor will determine rotation about one axis only and so normally two sensors at right angles to each other will be used.

One of the best reference lines or frames for determining attitude is the horizon and it is with an improved horizon sensor that the present invention is concerned. While as pointed out above the present invention is not concerned with any particular mechanism for correcting changes in attitude it is an advantage that the electrical signals which constitute the output from devices of the present invention are usable with practically any righting mechanisms.

Essentialy the horizon represents a line of discontinuity between the earth's atmosphere and outer space. This discontinuity is very marked, especially from high altitudes, and is characterized by a large difference in infrared radiation. Outer space is cold and its infrared radiation is very low. On the other hand, the earth and the earth's atmosphere are relatively much warmer. The horizon, therefore, represents a sharp line of discontinuity with an abrupt and great change in infrared radiation on either side of it.

The present invention utilizes these properties of the horizon by continuously scanning across it and applying the scanning beam to a detector for optical radiation, for example, a thermistor bolometer. An electrical output signal in the form of square waves or regular repeating rectangular pulses is produced. There is further provided means for generating reference pulses as the scan passes predetermined points in the vehicle, for example, two points on the vertical axis 180° apart. The device then electronically compares time intervals between horizon crossings and reference pulses producing an output signal differential in nature which gives information of the attitude of the vehicle with respect to the horizon. Putting it another way, it tells how much the horizon appears tilted with respect to the reference positions on vehicle and determines the direction of said tilt.

Another way at looking at the device is that the sums of the energy between reference signal pulses and adjacent horizon crossings are basically measurements of angular rotation between said crossings and reference signal. If the rotation is constant over each cycle determined by the reference pulses, uniformity of rotational speed becomes unimportant and the rotational intervals correspond to time intervals. This concept of time intervals is a simpler one to express and will be used in the remainder of the specification but it should be understood that in fact the time interval measurement is only a measurement of something which is proportional to the basic scan rotational intervals and the reference to time intervals is used merely for increased ease of expression and clarity.

In the preferred specific embodiment, the final output of the device consists of an electrical signal, the amplitude of which is proportional to tilt of said device, from a predetermined reference. The polarity of the output is determined by the direction of said tilt around the center line of the device. This may be done by comparison and averaging of time intervals.

The circuits which produce outputs proportional to time intervals may integrate energy exponentially in a manner similar to the operation of a computer of the analog type. When a change in tilt takes place the interval integrations must proceed over a sufficient but small number of cycles so that a new steady state is reached.

The determination of the time intervals may also be by counting and hence digitalized. In the case of digitalized counting, if the count is synchronized with rotation of the scan, uniformity of rotation even over a single cycle becomes unimportant because the counting is directly of rotational increments and does ont involve time at all.

It is an important advantage of the present invention that the only precision required is in the measurement of angular rotational increments. As a result precision electronic components are not vital and all that is necessary is that the electronic components be stable. The required stability is easily obtained using readily available components. Their exact values are unimportant.

When the device operates in a manner similar to an analog computer the energy integrals with time may be furnished by the horizon detector itself. This has the great advantage of simplicity, lightness and a minimum of moving parts. It suffers from the common failing of analog computers that its output can be affected by changing environmental factors, for example, changing temperature which may affect capacitor leakage, transistors, etc. However, the accuracy of the analog type is ordinarily sufficiently high for all practical purposes and this method or type of instrument is preferred for most practical uses. Where maximum accuracy and almost complete insensitivity to environmental changes is necessary, digitalization may be used. The accuracy can be increased by extending the number of digits within limits at, however, the price of additional circuit complication. When digitalization is used it is ordinarily sufficient to employ 11 binary digits which inherently provides better than .10° readout accuracy capability.

The scanning function, which is essential to the operation of the instrument, is preferably effected by rotation of a prism or mirror which directs the beam through suitable optics onto a detector. The angle of the scanning cone depends on the particular requirements. With scanning cones up to and around 120° prisms present some advantage as the image on the detector is not turned during the scanning cycle. However, there is a practical limit on the size of the scanning cone angle when a single prism is used. Cones, exceeding 120°, are not practical with a single prism and multiple prisms introduce excessive complexity although they are not excluded in the broadest aspect of the present invention. Mirror scanning has no such limitations and it is even possible to scan a 180° cone, that is to say a circular plane. This will rarely be necessary and adds certain complications because in such an instance the scanning head has to project beyond the vehicle rendering the whole device much more fragile and subject to adverse effects by the elements. For practical horizon sensors the scanning cone of about 110° is quite satisfactory and will be described and illustrated in the more detailed description of the invention.

Generation of reference signals, while an essential feature of the invention, is in no way limited to any particular signal generating means. Magnetic generators such as those described below are suitable and have many advantages. However, optical or other generators may also be used.

The invention will be described in greater detail in conjunction with the drawings in which:

FIG. 1 is a vertical section through the horizon sensor;

FIG. 2 is a plan view of the reference signal plate;

Figure 3:
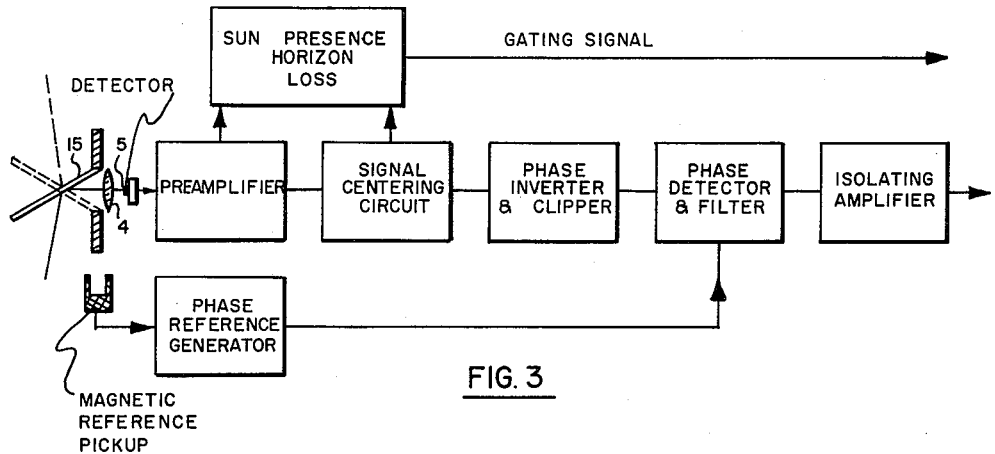
FIG. 3 is a block diagram of the corresponding electrical circuits.

The sensor shown in FIG. 1 consists of a rear cover 1, bolted to a front plate 2 on which is mounted a germanium lens 4 onto which the detector 5 is attached to form a high speed immersion lens, a magnetic pickup coil 6 and a drive motor 7. The motor drives a rotating assembly 8 journalled on ball bearings 9 on the detector and lens mount 3. The forward end of 8 is a mounting 10 carrying a wide angle scanning prism 11 which scans approximately a 110° cone. The front plate 2 also carries two high speed synchronous SPDT switches 12. The switches would be obscured by the scanning head and so one of them is shown in dotted lines in a position 90° away from its normal location. The operation of the switch is, of course, not affected by its particular location on the front plate. A sun shutter 16 is also carried by the assembly 8 and opens by centrifugal force when the assembly 8 rotates. If rotation stops the shutter closes protecting the detector from accidental prolonged exposure to the sun. Otherwise the detector might be injured by excessive heating. The construction of the shutter is conventional and it is used in the present device in its normal way. If the scanner while rotating inadvertently includes the sun in its scan the detector is not damaged but accuracy suffers from the over-powering sun pulses and as shown in FIG. 3 sun signals are processed to produce an output signal to gate off tilt readout signals until the sun is no longer scanned.

The electronic circuits are mounted on circuit boards 17 which are attached to the front plate 2. The boards are shown without components for clarity as the individual circuits are conventional in design. While their combination forms a part of the present invention their particular configuration and design does not.

The sensor is shown empty in order that the constituents can be clearly seen. In practice the electronic circuits within the cover 1 are potted with suitable protecting plastic to protect them against deterioration in use and give protection against shock and vibration. It is also desirable to mount a cover over the front plate 2 with a conventional infrared window. As the cover does not affect the operation of the instrument it is not shown. This cover together with the cover 1 permits sealing and maintenance of an inert atmosphere within the unit.

In operation the motor 7 drives the rotating scanning head at approximately 30 c.p.s. and the scanned beam from the prism 11 is imaged by the lens 4 on the detector 5. It shows a relatively high infrared radiation intensity as it scans the earth which drops suddenly to low value as it passes across the horizon and scans space. Carried by the plate 8 is a magnetic insert 13 (see FIG. 2), which produces a pulse in the magnetic reference pickup coil as it enters its field and as it leaves it. These pulses correspond to the vertical reference axis of the front plate 2.

In FIG. 3 there is shown in block diagram form the electronic circuits together with a diagrammatic illustration of a different scanning device. The scanning device uses a mirror 15 instead of a rotating prism. The beam is focused on the detector 5 by means of a germanium lens 4.

As noted above the output signals from the detector are of two types, either a low level signal as the beam scans cold space or a much higher level signal when scanning the earth or the earth's atmosphere. The change from one signal level to the other is abrupt when the scan passes the horizon, twice each revolution. Ideally this signal should be in the form of square waves or rectangular pulses. However, response of the detector is not instantaneous and so the preamplifier of FIG. 3, while of standard design, has two characteristics. First it has good low frequency response in order to transmit a good square wave and secondly it is provided with high frequency boost to compensate for the time constant of the detector and to steepen the sides of the square waves or rectangular pulses produced.

As it is desirable to center the signal D.C. signal centering circuits are provided. The signal is then passed through a phase inverter and clipper and into a phase detector and filter circuit. Pulses received by the magnetic pickup coil are fed to a phase reference generator circuit and the output of this generator is fed into the phase detector and filter circuits. As the last circuits are provided with capacitive inputs D.C. centering is eliminated and the centering from here on is with respect to the average of the signals. When the sensor is pointed at the sun or when it has lost the horizon and is looking only at space the circuits provide gating signals which prevent use of the information from the sensor until such time as it once more sees the horizon without seeing the sun. Complete information is passed on to the righting mechanisms only when both sensors see their respective horizons. However, when one sensor sees its horizon the resulting signals actuate righting means which eventually bring the horizon into the field of view of the other sensor. When both sensors are pointed out into space, or one at the sun and one at space, no righting signals are produced by either sensor. This, however, presents no problem as there is always some residual motion of the satellite which eventually, and usually fairly soon, brings the horizon into the field of view of at least one of the sensors.

The phase generator signal also drives the two high speed SPDT switches 12. These switches gate the voltage output from the phase inverter and clipper circuits but, of course, do not change their amplitudes.

Figure 4:
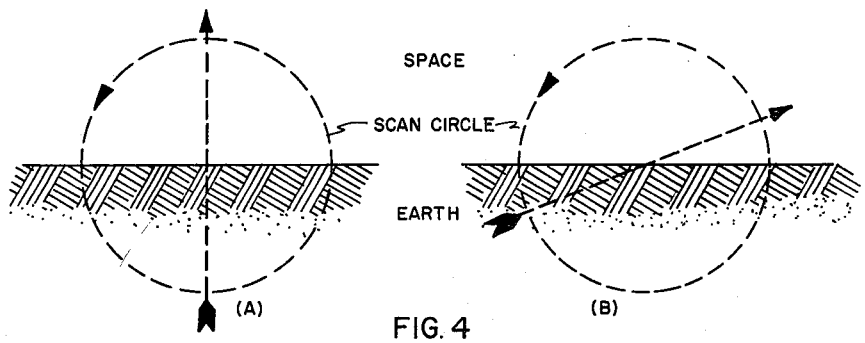
FIG. 4 shows a pair of horizons, one with an upright vehicle and the other with a tilted one.

FIG. 4 shows two views of the scanning beam circle and the horizon, A and B, seen by the sensor. The first corresponds to a vehicle which is correctly oriented with respect to the horizon as is shown by the dashed arrow which represents the vehicle axis. The second depicts the situation where the vehicle is badly tilted as is shown by the tilt of the vehicle orientation arrow. In both cases the horizon is centered on the axis of the sensor.

It will be noted that in FIG. 4A the intervals from horizon crossing to reference pulse at one end of the arrow and the pulse to the other horizon crossing are equal. Since the axis of the sensor is centered on the horizon the times from second horizon crossing to the pulse at the other end of the arrow and from there to the next horizon crossing are also equal and each is of the same duration as in the first pair. Direction of the scan is shown by an arrowhead.

The resulting signal outputs are shown in FIG. 5A as areas representing integrated square waves. It will be seen that when the vehicle is level, that is to say when the time between one horizon crossing and a reference signal is the same as from the reference signal to the other horizon crossing, the net output voltage will be zero. This will be evident from FIG. 5A. When the vehicle tilts there will be a phase shift and as a result there will be a net voltage output. In FIG. 5B for the tilted position this is illustrated as a net negative voltage.

Figure 5:
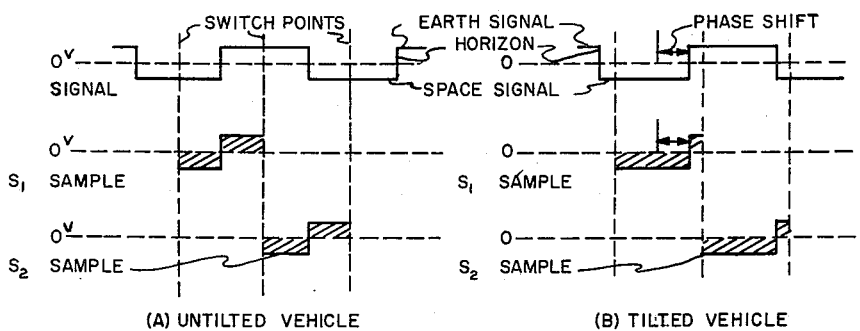
FIG. 5 is a pair of electrical output diagrams for the two vehicle attitudes shown in FIG. 4.
Figure 6:
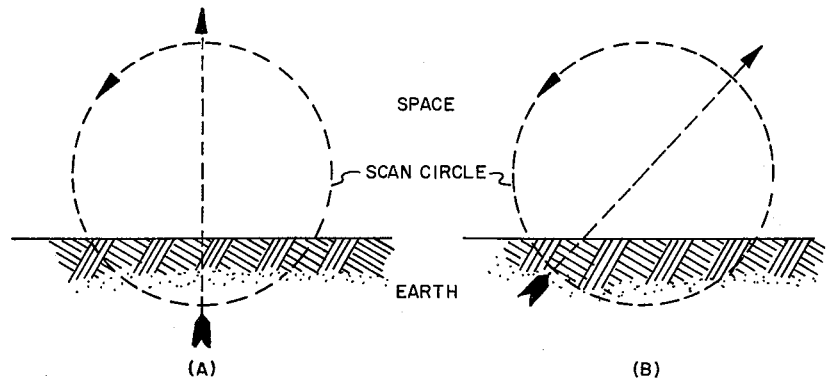
FIG. 6 is a pair of diagrams similar to FIG. 4 but for sensor orientations in which the axis of the sensor is above the horizon.
Figure 7:
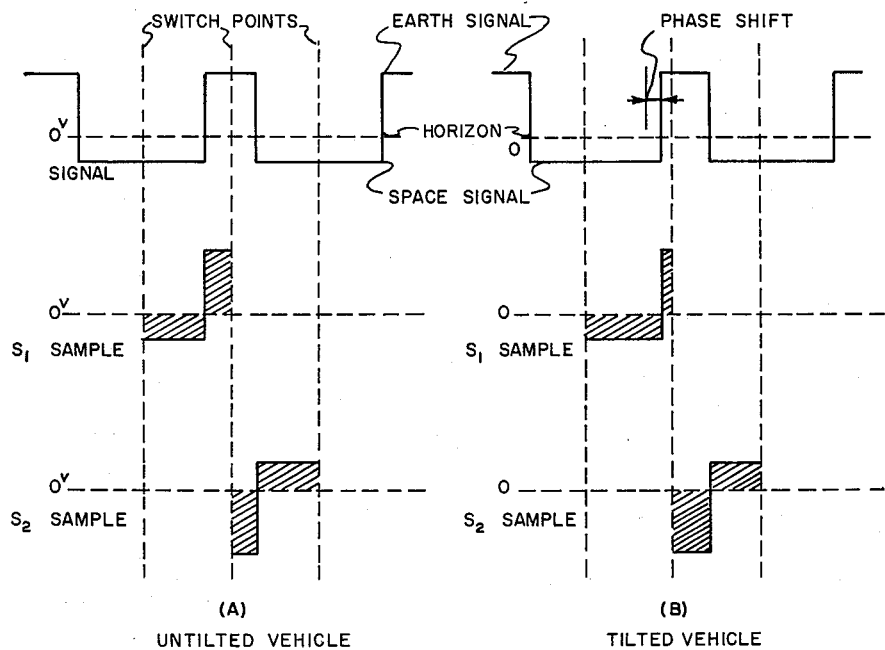
FIG. 7 is a pair of electrical output diagrams for the vehicle attitudes shown in FIG. 6.

FIG. 6, A and B, shows a set of horizon images similar to those shown in FIG. 4 but here the axis of the sensor is above the horizon. FIGS. 4 and 5 show the effect of a large vehicle tilt, for example, when the sensor first sees the horizon and before the righting mechanisms have corrected the tilt. FIGS. 6 and 7 illustrate situations where the tilt is less and corresponds to situations where partial righting has taken place.

It will be noted that in FIG. 6A, although the time intervals from horizon crossing to one reference pulse and from this pulse to the next horizon crossing are equal, they are smaller than the pair of intervals from the second horizon crossing to the other reference pulse and from it back to first horizon crossing. In FIG. 6B the time intervals in each pair will be unequal but again the intervals of one pair will be larger than in the other. As a result the output signals shown in FIG. 7, A and B, are not square waves but repeating pairs of rectangular pulses of different pulse width. However, since the signal output is centered with respect to average signal as described above instead of D.C. centering, the error signal with tilt will be of the same nature as in FIGS. 4 and 5.

Looking at the sensors of FIGS. 1 or 3 and the electronic circuits shown in FIG. 3 it will be noted that the time between horizon crossings and reference signal is in the form of a continuous electrical output and this signal from the detector is integrated over the time interval. In the case of a tilted horizon these time intervals are different. The output voltages are therefore analogs of these time differences. The circuits are relatively simple, compact and a device of maximum simplicity and minimum weight results.

Figure 9:
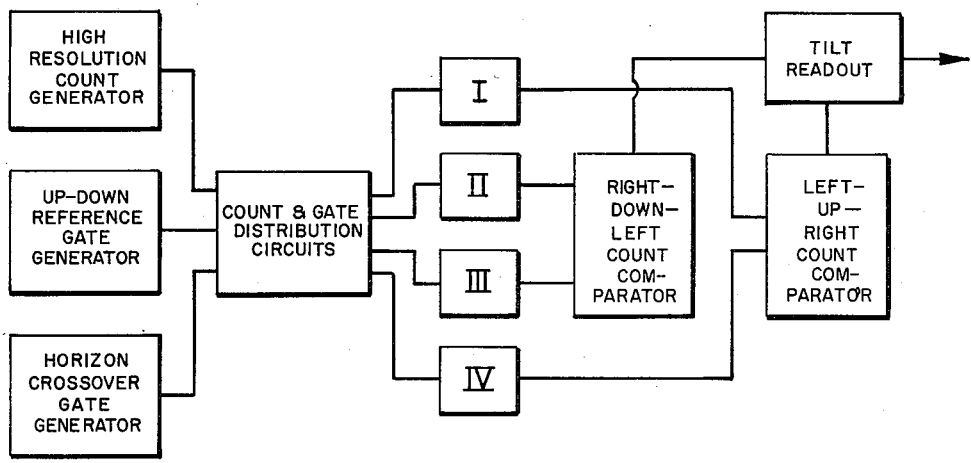
FIG. 9 is a block diagram showing the arrangement of circuits for digital counting.
Figure 8:
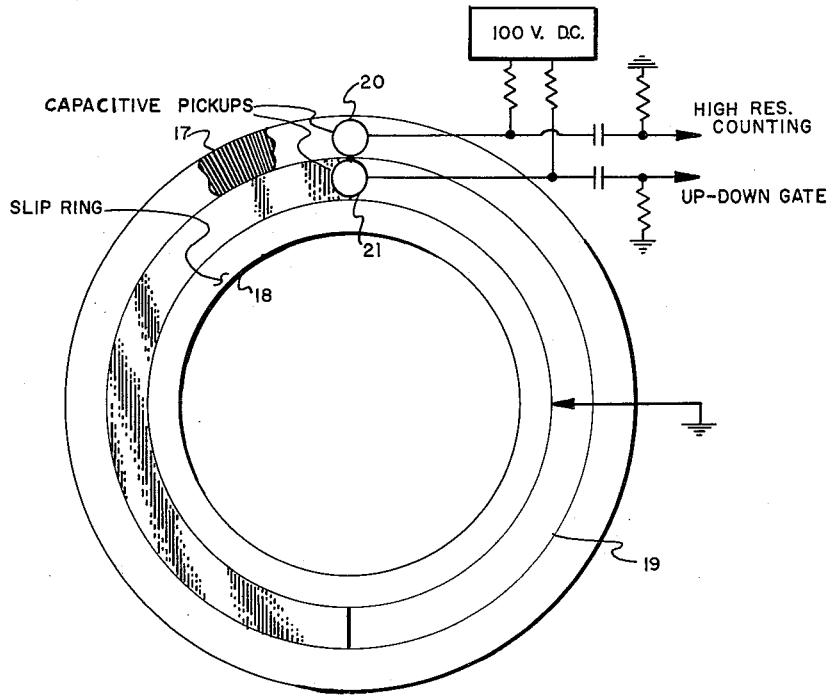
FIG. 8 is a plan view of a counting plate for digital counting.

FIGS. 8 and 9 show a modification in which comparison of the times is digitalized. In FIG. 8 a different rotating plate is shown than in FIG. 1. It is synchronously driven in exact step with the scanning head. This disc forms a counting clock, the outer ring being provided with a series of conductive bars. In a practical device for counting 11 binary digits there are 2048 bars. For sake of simplicity and clearness in the drawing, a greater spacing of conductive bars is shown which would correspond to lower frequency of count. Also only a few bars on one part of the disc are illustrated. The drawing is illustrative only and for a practical device 2048 bars are satisfactory. All of the conductive bars are connected to the slip ring 18 which is grounded as shown. An intermediate band with a semi-circular conductive annulus, 19, likewise grounded through the slip ring produces two reference signals in the form of pulses for each revolution. The capacitative counting circuit is shown in conventionalized schematic with a 100 volt D.C. supply (a very practical value for most instruments), and the accompanying coupling condensers and load resistors.

FIG. 9 shows, in block form, the circuitry which is rather different from FIG. 3 as here both the up and down reference signals and horizon cross-over signals operate gates in the data processing circuitry which in turn is fed from the high speed counting pulses. The outputs of this circuit are fed into four counters, I, II, III and IV, which are conventional counting circuits. The reference generator gating and horizon cross-over gating result in passing the high resolution counting to counter I during the interval from the up reference signal to the left horizon crossing. In other words, the up reference signal opens a gate to this counting circuit and the left horizon crossing signal closes it. In a similar manner counter II counts between left horizon crossing and down reference signal, counter III between down reference signal and right horizon crossing and IV between right horizon crossing and up reference.

Two comparator circuits, A and B, are shown comparing respectively the count of counters I and IV and of counters II and III. The outputs of these two comparator circuits at the end of a cycle are gated into a tilt readout circuit which in turn produces an output signal representing the time difference between horizon crossings and any one reference signal. The accuracy is to one part in $2^{11}$ in the modification illustrated in FIGS. 8 and 9. After a cycle is completed counters, count comparators and tilt readout are automatically reset by the conventional circuit operations used in digital computers. The device is then ready to compare counts for another cycle.

The present invention has been described in connection with a complete instrument in which the signals, which are measures of the rotational intervals between horizon crossings and reference pulses, are automatically compared and a final differential signal obtained which contains the information as to amount of tilt and direction. The automatic comparison is instantaneous and lends itself to applications where the righting mechanisms can be actuated in accordance with the final output signal. This is essential in the case of unmanned satellites and is desirable where precise and prompt control is important. However, in a vehicle which is manned it is possible for the pilot to effect the righting corrections if he is given the information as to the relative rotational intervals and such a subcombination is included within the scope of the invention.

The invention has been described in detail in conjunction with the use of a particular type of optical radiation, namely infrared, but it is not limited thereto and other types of optical radiation may be used for determining lines of discontinuity. For instance, in some cases visible light may be used. Of course, this is limited to conditions where the line of discontinuity is marked by a difference of radiations in the visible light spectrum.

For example, in a satellite or even a fairly high flying aircraft a device using visual light would be effective only during the time when the horizon is illuminated. This is the reason why the modification using infrared radiation is the preferred one as it is generally useful in a larger number of situations. However, where lines of discontinuity of visual or ultraviolet radiation exist the device is just as useful with detectors for these radiations.

The invention has been described as a horizon sensor and more specifically as a device which puts out an error signal that can be used to maintain a constant predetermined attitude about two of three mutually perpendicular axes in space. The invention can also be used as an altimeter. When the vehicle is level with respect to the horizon about the roll axis and the pitch axis, the altitude of the vehicle can be determined by a reading obtainable from either the roll sensor or pitch sensor. As was described above, if the axes of the sensor scanning mechanisms are above the horizon even though there is no tilt, the signal from the detectors will be a series of repeating rectangular pulses. The angular width of the pulses correspond to the two rotational intervals, when earth and space are being scanned. This correspondence can be used to measure altitude over certain practical limits which will be set out below.

The temperatures of space and of earth remain constant for any particular short period of time. The voltage from either detector when viewing space is a minimum and be considered as the zero reference whereas when viewing the earth it is at a maximum. If this signal is introduced into an integrating circuit of time constant large compared to the time of a single rotation of the scanner, the output from said circuit is proportional to the angular pulse width of the pulses when the scanner is viewing the earth. For purposes of the discussion below this output voltage will be designated E and the maximum peak voltage of the earth's pulses as $E_{max}$. The length of scan of the earth in degrees will be designated $b$, which equals $360° \times E/E_{max}$. For convenience in computation another angle measurable in terms of $b$ will be used. This is the angle $\alpha$, which is related to $b$ as follows:

$$\alpha = \frac{180° - b}{2}$$

Another quantity R is defined as one-half the scan cone apex angle. In the specific illustration described in connection with the drawings R is 55°. Other quantities and relations will be defined as follows:

$r = \sin R$
$h = r \sin \alpha$
$\theta =$ depression angle
$\sin \theta = h$
arc $\sin h = \theta$
$a =$ altitude $$\cos \theta = \frac{4000}{4000 + a}$$

$$a = 4000 \times \frac{1 - \cos \theta}{\cos \theta} = (\sec \theta - 1) \times 4000 \text{ miles}$$

In the above derivation the figures are given for the earth, the radius of which is 4,000 miles. If it is desired to use the horizon sensor to measure altitude above some other body, such as for example the moon, the corresponding radius must be used.

The lower limit for altitude measurement is determined by the fact that the horizon may be the discontinuity of the tropopause rather than the horizon of the earth itself. This makes the sensors useful only above altitudes of about 10 miles. With a scanning cone angle of 110° the upper limit would be a depression angle of 55° which represents 2,970 miles. However, at the limit the sensor sees the earth for so short an angle $b$ that the measurement is not accurate. Therefore, with the 110° cone of scan the practical upper limit is about 2500 miles.

If scanning cones of greater angle, for example if the extreme of 180°, is used altitudes can be measured that are theoretically infinitely high. Again as a practical matter the accuracy with which the detector output can be measured is such that when $\theta$ approaches 90° and, therefore, the increase in the value of sec $\theta$ changes with extreme rapidity the altitude can no longer be measured with accuracy. A practical maximum upper limit is, therefore, about 100,000 miles.

Within the above practical limits where measurement of altitude is important the device of the present invention is capable of giving results acceptable accuracies.

As was pointed out above the mathematical expression for altitude presupposes no apparent tilt of horizon on either the pitch or roll axis. In the case of satellites, which constantly correct their attitude, the altitude measurement signal can be gated so that it is read only when there is no apparent tilt to the horizon. Where slow swings through a small angle are permissible, the device may be provided with further corrections due to the effect of a small tilt.

Figure 10:
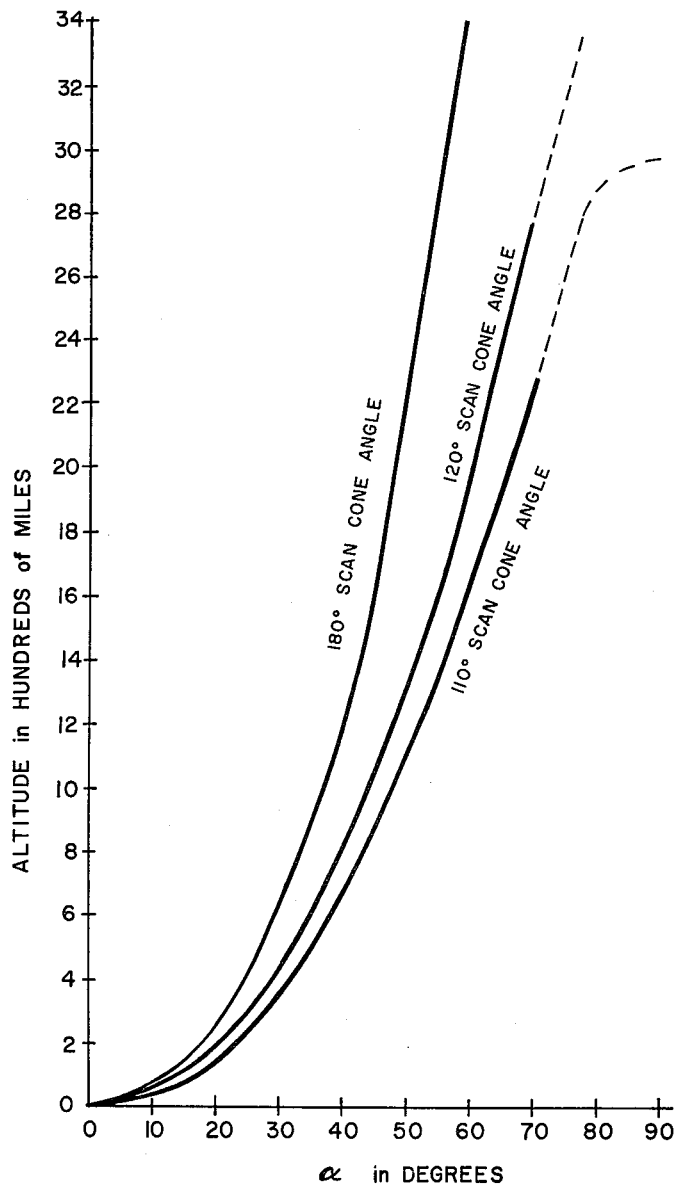
FIG. 10 is a graph of altitude vs. scan rotation angle.

FIG. 10 is a plot of altitude vs. $\alpha$ for scan cones of three angles. The curves of all three scan cones are smooth and represent relatively simple continuous functions (within the useful limits of the device). There is no excessively abrupt rate of change and, therefore, the graphs lend themselves to the simplest kind of instrumentation, for example, of the analog computer type. The graphs of the functions also lend themselves to the calibration of standard meter scales, which provides for simple, reliable and compact altitude readout capability. It is an important advantage of the present invention that in addition to its primary function of determining the attitude of a vehicle in space it can also be used as an altimeter with the addition of simple, light components which do not require any excessive power consumption.

The function of the device as an altimeter has been described in the preferred embodiment in which the two horizon sensors perform dual functions, that is to say, either one can determine that there is no apparent horizon tilt and then the other one can read altitude. It should be noted that the sensor which is reading altitude is not making any use, for this particular purpose, of the reference signals at predetermined portions of the scan and, therefore, if there are means to produce a level attitude of the vehicle the altimeter measuring device does not have to have any reference signals. When horizon sensors are used, with or without equipment to permit levelling of the vehicle, either one can perform the function of an altimeter. In such a case if there were such a special altimeter scanner without any reference signals it would constitute an unnecessary additional piece of equipment. However, if means other than horizon sensors of this invention produce a levelling of the vehicle with respect to the horizon about the axes in the plane parallel to it, then altimetric measuring devices may dispense with any reference signal generator and such devices are included within the scope of the invention.

I claim:

1. A device for measuring tilt of a distant line of discontinuity in optical radiation comprising in combination a detector for such radiation, scanning means imaging a beam of such radiation from a scanning cone of predetermined angle on said detector, driving means for said scanning means, means driven by said driving means synchronized with the scanning means for generating at least one reference signal at a predetermined point in the scan, whereby signals are generated by the reference generator and by the detector at each crossing of the line of radiation discontinuity, and electronic means associated with the reference generator and detector for measuring rotational intervals between signals.

2. A device according to claim 1 in which the reference generator generates two signals 180° apart in terms of the scanning cone.

3. A device according to claim 1 in which the optical radiation is infrared and the detector is an infrared detector.

4. A device according to claim 2 in which the optical radiation is infrared and the detector is an infrared detector.

5. A device according to claim 1 in which the detector produces a continuous electrical signal between crossings of the line of radiation discontinuity and the averaged integrated amounts of said continuous outputs measures the rotational intervals.

6. A device according to claim 5 in which the optical radiation is infrared and the detector is an infrared detector transforming infrared radiation into electrical signals.

7. A device according to claim 1 in which means are provided for electrically comparing the measurements of the rotational intervals and producing a differential final output signal which is a function of the difference between said intervals and indicating direction of any difference.

8. A horizon sensor comprising in combination an infrared detector, scanning means imaging an infrared beam from a scanning cone of predetermined angle on said detector, driving means for said scanning means, means driven by said driving means synchronized with said scanning means for generating a reference signal at two points 180° apart in terms of the scanning cone whereby pulses are generated by the reference generator at two points in each revolution and by the detector at each horizon crossing and continuous signal output is produced by the detector between pulses, electronic means associated with reference generator and detector for measuring rotational intervals between each horizon crossing and succeeding reference pulse and between said pulse and the next horizon crossing and electronic means for comparing the measurements and for producing a differential output proportional thereto.

9. A horizon sensor according to claim 8 in which the means for interval measurements comprise integrating means for detector output between pulses and the comparison means receives signal from both reference generator and detector and comprises means actuated by reference generator pulses for reversing the phase of the detector signal output.

10. A horizon sensor according to claim 8 in which the interval measuring means comprise digital comparing means synchronously driven with the scan, a plurality of counting circuits, one for each period between horizon pulse and reference pulse and gating means actuated by said pulses for successively connecting one of the counters during each corresponding portion of the scanning cycle.

11. A horizon sensor according to claim 8 in which the scanning means is a rotating tilted prism.

12. A horizon sensor according to claim 8 in which the scanning means is a rotating tilted mirror.

13. A horizon sensor according to claim 8 in which the reference pulse generator comprises a disc rigidly connected with the scanning prism and rotating therewith, magnetic pickup means adjacent to said disc and an annular insert in the disc of magnetic material extending for a semicircle.

14. A horizon sensor according to claim 8 in which the infrared detector is a thermistor bolometer.

15. An altimeter comprising in combination two horizon sensors each comprising a detector for optical radiation, scanning means for imaging a beam from a scanning cone of predetermined angle on each detector, the axes of the cones being at right angles to each other, driving means for the scanning means, means driven by the driving means synchronized with the scanning means for generating at least one reference signal at a predetermined point in each scan, whereby signals are generated by the reference generators and by the detectors when they cross the horizon, electronic means associated with reference generators and detectors for measuring rotational intervals between signals, means actuated by either horizon sensor when it measures pairs of equal rotational intervals to produce an output signal from the other sensor proportional to angular widths of the rotational intervals.

16. A device according to claim 15 in which the sensors are provided with infrared detectors and the scanning beams are infrared beams.

17. An altimeter according to claim 15 in which the final output signal is proportional to a function of interval widths defining altitude.

18. An altimeter according to claim 16 in which the final output signal is proportional to a function of interval widths defining altitude.

19. An altimeter comprising, in combination, means for determining parallelism with a horizon on at least one of two perpendicular axes in a plane parallel to said horizon, means for conical scanning of the horizon in a cone of predetermined angle whose axis is at right angles to said first axis, said means comprising a detector for optical radiation, means for imaging a beam from the said scanning cone on the detector and electronic means receiving detector output for producing a signal proportional to the angular rotation of the scanning beam from horizon crossing to horizon crossing.

20. An altimeter according to claim 19 comprising data processing means for transforming the signal proportional to the angular rotation of scan from horizon to horizon into a function proportional to altitude.

References Cited in the file of this patent

UNITED STATES PATENTS

| 2,740,961 | Slater | Apr. 3, 1956 |
| 2,897,369 | Ketchledge | July 28, 1959 |
| 2,918,581 | Willey et al. | Dec. 22, 1959 |